United States Patent Office 3,542,767
Patented Nov. 24, 1970

3,542,767
SUBSTITUTED 1,3,4-BENZOTRIAZEPIN-5H-5-ONES
André L. Langis, St. Laurent, Quebec, Canada, assignor to American Home Products Corporation, New York, N.Y., a corporation of Delaware
No Drawing. Filed Feb. 29, 1968, Ser. No. 709,177
Int. Cl. C07d 55/54
U.S. Cl. 260—239.3         16 Claims

ABSTRACT OF THE DISCLOSURE

There are disclosed herein 1(3)4-dihydro-1,3,4-benzotriazepin-5H-5-ones, optionally substituted in position 7 with chloro and nitro groups and in position 2 with phenyl, benzyl, 3'-pyridyl, 4'-pyridyl, methyl, propyl, nonyl, and biphenyl grops, as well as 2-benzyl-1,4-dihydro-1-methyl-1,3,4-benzotriazepin-5H-5-one and 1,4-dihydro-1,2-dimethyl-1,3,4-benzotriazepin-5H - 5 - one. The compounds are useful as anticonvulsant and antiinflammatory agents of low toxicity, and methods for their preparation and for their use are also disclosed.

---

This invention relates to new chemical compounds, new substituted 1,3,4-benzotriazepin-5H-5-ones, which have pharmacological activities as hereinafter set forth. These chemical compounds may be designated by the formula $$\text{X} \underset{}{\overset{}{\bigcirc}} \begin{array}{c} \text{CO—NH} \\ \\ \text{N} \\ \text{N—C} \\ \text{R}^2\ \text{R}^1 \end{array} \quad (I)$$

in which X represents hydrogen, chlorine, or the nitro group; $R^1$ represents a lower alkyl group containing from one to nine carbon atoms such as, for example, the methyl, propyl, or nonyl group, the phenyl, benzyl or 4-biphenyl group, and the 3-pyridyl or the 4-pyridyl group; and $R^2$ represents hydrogen or the methyl group. Chemically these compounds may be regarded as 1,3,4-benzotriazepin-5H-5-ones.

When $R^2$ represents hydrogen, in the above formula, the compounds are capable of appearing in two tautomeric forms, one of which, represented by Formula Ib below may be regarded as a 3,4-dihydro derivative. The tautomeric change occurring may be indicated as follows:

$$\text{X} \underset{}{\overset{}{\bigcirc}} \begin{array}{c} \overset{\text{O}}{\overset{\|}{\text{C}}}\text{—}\overset{\text{H}}{\overset{|}{\text{N}}} \\ \text{N} \\ \text{N—C} \\ \text{H}\ \text{R}^1 \end{array} \rightleftarrows \text{X} \underset{}{\overset{}{\bigcirc}} \begin{array}{c} \text{CO—NH} \\ \\ \text{NH} \\ \text{N}=\text{C} \\ \text{R}^1 \end{array}$$
(Ia) (Ib)

In Formula Ia the compounds are 1,4-dihydro derivatives. Regardless of the tautomeric form in which the compounds appear they are the same, irrespective of the chemical nomenclature employed. I therefore prefer to name them as substituted 1,3,4-benzotriazepin-5H-5-ones of Formula I above.

The new and novel 1,3,4-benzotriazepin-5H-5-ones of this invention have been found to possess interesting pharmacological properties. More particularly, these compounds have exhibited utility as anti-convulsant agents in standard pharmacological tests, for example in the test using pentamethylenetetrazole as the challenging agent described by Berger in Proc. Soc. Exp. Biol. Med. vol. 78, p. 277 (1951), and in the test using electroshock described by Swinyard et al. in J. Pharmacol, vol. 106, p. 319 (1952). Moreover, the compounds of this invention have also exhibited utility as anti-inflammatory agents in standard pharmacological tests, for example, in the rat paw edema test described by Winter et al. in Proc. Soc. Exp. Biol. Med., vol. 111, p. 544 (1962).

When the compounds of this invention are employed as anti-convulsant agents in warm-blooded animals, for example, in rats or in mice, alone or in combination in pharmacologically acceptable carriers, the proportion of the latter is determined by the solubility and the chemical nature of the compound, by the chosen route of administration, and by standard pharmacological practice. For example, the compounds of this invention may be administered orally in solid form together with suitable excipients such as starch, lactose, certain types of clay, and similar products. They may also be administered orally in the form of solutions or suspensions, or they may be injected parenterally. For parenteral administration they may be used in the form of sterile solutions which may also contain other solutes, for example enough salt or glulose to make the solutions isotonic.

In practical use the new pharmacologically active substituted 1,3,4-benzotriazepin-5H-5-ones may be utilized at various dosages and frequencies of administration, both depending upon the manner of administration employed and other controlling factors. Generally it is preferred to begin by the use of relatively small dosages of the of the particular pharmacologically active compound utilized, these dosages initially being substantially less than optimal dosages. Thereafter the dosage may be increased by small increments until more satisfactory treatment results are secured, and until the optimum effect under the circumstances is reached. In general, the compounds of this invention are most desirably administered at a concentration level that will generally afford effective results without causing any harmful or deleterious side effects and preferably at a level that is in a range of from about 10 mg. to about 100 mg. per kilogram body weight. When using them as anti-convulsant agents single oral doses of from 15 to 75 mg. per kilogram body weight are preferred, and when using them as anti-inflammatory agents single oral doses of 100 mg. per kilogram body weight are preferred.

Such dosages may be administered from 1 to 3 times per day, as required.

The compounds of this invention are particularly distinguished by possessing a low order of toxicity.

The compounds of this invention of Formula I in which $R^1$, $R^2$ and X are as defined above, may be prepared by reacting isatoic anhydride or a substituted isatoic anhydride of Formula II in which $R^2$ and X are as defined above with an equimolar amount of a hydrazide of the formula $R^1CONHNH_2$ in which $R^1$ is as defined above, to obtain the correspondingly substituted N-(o-aminobenzoyl) or substituted (o-aminobenzoyl)-$N^1$-acylated hydrazines of Formula III. The latter compounds are cyclized by treatment with polyphosphoric acid at elevated temperatures, preferably between 60° C. and 180° C., quenching the reaction mixture in ice water, and isolating the desired reaction product by filtration, followed by resuspending the crude product in water, neutralization, filtration and recrystallization of the desired substituted 1,3,4-benzotriazepin-5H-5-ones.

The following examples and formulae, in which X, $R^1$ and $R^2$ have the significance described above, will illustrate this invention. All compounds are identified by elemental analysis and by infrared or ultraviolet spectrography.

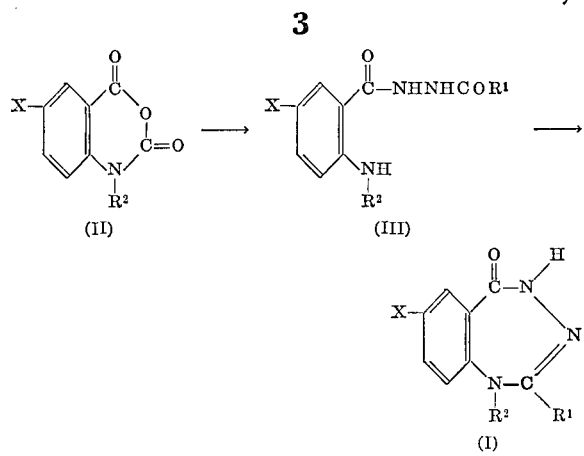

EXAMPLE 1

Disubstituted hydrazines

A mixture of 5-chloroisatoic anhydride (19.7 g., 0.1 mole) and phenylactic acid hydrazide (15 g., 0.1 mole) in 400 ml. of ethanol is heated to reflux for 20 hours. The solution is cooled and the crystals are collected. Recrystallization from ethanol yields N-(2-amino-5-chlorobenzoyl)-N'-phenylacetyl hydrazine, M.P. 216°–218° C.

In the same manner, when refluxing together, in ethanolic solution, equimolar quantities of isatoic or substituted isatoic anhydrides and various acid hydrazides, the following substituted hydrazines are obtained and are purified by recrystallization from ethanol or ethyl acetate:

Isatoic anhydride and nicotinic acid hydrazide yield N-(2-aminobenzoyl)-N'-nicotinoyl hydrazine, M.P. 204°–206° C.

5-chloroisatoic anhydride and nicotinic acid hydrazide yield N-(2-amino-5-chlorobenzoyl)-N'-nicotinoyl hydrazine, M.P. 224°–226° C.

Isatoic anhydride and isonicotinic acid hydrazide yield N-(2-aminobenzoyl)-N'-isonicotinoyl hydrazine, M.P. 185°–187° C.

5-chloroisatoic anhydride and isonicotinic acid hydrazide yield N-(2-amino-5-chlorobenzoyl)-N'-isonicotinoyl hydrazine, M.P. 240°–243° C.

5-nitroisatoic anhydride and isonicotinic acid hydrazide yield N-(2-amino-5-nitrobenzoyl)-N'-isonicotinoyl hydrazine, M.P. 335° C. (dec.).

Isatoic anhydride and butyric acid hydrazide yield N-(2-aminobenzoyl)-N'-butanoyl hydrazine, M.P. 138°–140° C.

5-chloroisatoic anhydride and butyric acid hydrazide yield N-(2-amino-5-chlorobenzoyl)-N'-butanoyl hydrazine, M.P. 187°–189° C.

5-nitroisatoic anhydride and butyric acid hydrazide yield N-(2-amino-5-nitrobenzoyl)-N'-butanoyl hydrazine, M.P. 258°–261° C.

Isatoic anhydride and decanoic acid hydrazide yield N-(2-aminobenzoyl)-N'-decanoyl hydrazine, M.P. 110–112° C.

Isatoic anhydride and 4-biphenylcarboxylic acid hydrazide yield N-(2-aminobenzoyl)-N'-(4'-biphenylcarbonyl) hydrazine, M.P. 228°–230° C.

N-Methylisatoic anhydride and phenylacetic acid hydrazide yield N-(2-methylaminobenzoyl)-N'-phenylacetyl hydrazine, M.P. 173°–175° C.

EXAMPLE 2

1,3,4-benzotriazepin-5H-5-ones

A mixture of 20.0 g. (0.078 mole) of N-(2-aminobenzoyl)-N'-benzoyl hydrazine, prepared as described by Heller in J. Prakt. Chem. [2] vol. 111, p. 44 (1925), and 100.0 g. of polyphosphoric acid is stirred and heated at 150–180° C. for one hour. The mixture is poured in 100 ml. of ice and water, the solid material is filtered off, suspended in water and potassium carbonate is added until the mixture is alkaline. The precipitate is filtered, washed with water, and recrystallized from ethanol to yield 1(3),4 - dihydro - 2 - phenyl - 1,3,4 - benzotriazepin-5H-5-ones, M.P. 168–169° C.

In the same manner, by stirring and heating one part of a substituted hydrazine, as enumerated below, prepared as described in Example 3 except where indicated, with five parts of polyphosphoric acid and working up as described above, the following substituted 1,3,4-benzotriazepin-5H-5-ones are also obtained.

N - (2-amino-5-chlorobenzoyl)-N'-phenylacetyl hydrazine yields 2-benzyl-7-chloro-1(3),4-dihydro-1,3,4-benzotriazepin-5H-5-one, M.P. 148–150° C.

N-(2-aminobenzoyl)-N'-nicotinoyl hydrazine yields 1(3),4 - dihydro - 2 - (3'-pyridyl)-1,3,4-benzotriazepin-5H-5-one, M.P. 153–155° C.

N - (2 - amino - 5-chlorobenzoyl)-N'-nicotinoyl hydrazine yields 7 - chloro - 1(3),4 - dihydro-2-(3'-pyridyl)-1,3,4-benzotriazepin-5H-5-one, M.P. 175–177° C.

N-(2-aminobenzoyl) - N' - isonicotinoyl hydrazine yields 1(3),4 - dihydro-2-(4'-pyridyl) - 1,3,4 - benzotriazepin-5H-5-one, M.P. 180–182° C.

N-(2 - amino-5-chlorobenzoyl)-N'-isonicotinoyl hydrazine yields 7-chloro-1(3),4-dihydro-2-(4'-pyridyl)-1,3,4-benzotriazepin-5H-5-one, M.P. 213–215° C.

N-(2-amino-5-nitrobenzoyl) - N' - isonicotinoyl hydrazine yields 1(3),4-dihydro, 2-(4'-pyridyl)-7-nitro-1,3,4-benzotriazepin-5H-5-one, M.P. 250–253° C.

N-(2-aminobenzoyl)-N'-butanoyl hydrazine yields 1(3),4-dihydro-2-propyl-1,3,4 - benzotriazepin-5H-5-one, M.P. 222–225° C.

N-(2-amino - 5 - chlorobenzoyl) - N' - butanoyl hydrazine yields 7-chloro-1(3),4-dihydro-2-propyl-1,3,4-benzotriazepin-5H-5-one, M.P. 128–130° C.

N-(2-amino-5-nitrobenzoyl)-N'-butanoyl hydrazine yields 1(3),4-dihydro-7-nitro - 2 - propyl-1,3,4-benzotriazepin-5H-5-one, M.P. 140–142° C.

N-(2-aminobenzoyl)-N'-decanoyl hydrazine yields 1(3),4-dihydro-2-nonyl - 1,3,4 - benzotriazepin-5H-5-one, M.P. 55–57° C.

N-(2-aminobenzoyl)-N'-acetyl hydrazine, prepared as described by Heller cited above, yields 1(3),4-dihydro-2-methyl - 1,3,4 - benzotriazepin - 5H - 5 - one, M.P. 146–148° C.

N-(2-aminobenzoyl)-N'-(4'-biphenylcarbonyl) hydrazine yields 2 - biphenyl-1(3),4-dihydro-1,3,4-benzotriazepin-5H-5-one, M.P. 195–197° C.

N - (2 - methylaminobenzoyl)-N' - phenylacetyl hydrazine yields 2-benzyl-1,4-dihydro-1-methyl - 1,3,4 - benzotriazepin-5H-5-one, M.P. 84–85° C.

N-(2-methlaminobenzoyl)-N'-acetyl hydrazine, prepared as described by Heller cited above yields 1,4-dihydro-1,2-dimethyl-1,3,4-benzotriazepin-5H-5-one, M.P. 90–93° C.

I claim:

1. A compound selected from the group having the formula

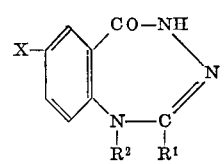

wherein X is selected from the group which consists of hydrogen, chlorine and nitro; $R^1$ is selected from the group which consists of lowwer alkyl containing from one to nine carbon atoms, phenyl, benzyl, 4-biphenyl, 3-pyridyl and 4-pyridyl; and $R^2$ is selected from the group which consists of hydrogen and methyl.

2. 1(3),4 - dihydro-2-phenyl-1,3,4-benzotriazepin-5H-5-one, as claimed in claim 1.

3. 2-benzyl-7-chloro-1(3),4-dihydro - 1,3,4 - benzotriazepin-5H-5-one, as claimed in claim 1.

4. 1(3),4-dihydro-2-(3'-pyridyl)-1,3,4 - benzotriazepin-5H-5-one, as claimed in claim 1.

5. 7-chloro-1(3),4-dihydro-2-(3'-pyridyl)-1,3,4 - benzotriazepin-5H-5-one, as claimed in claim 1.

6. 1(3),4-dihydro-2-(4'-pyridyl)-1,3,4 - benzotriazepin-5H-5-one, as claimed in claim 1.

7. 7-chloro-1(3),4-dihydro-2-(4'-pyridyl)-1,3,4 - benzotriazepin-5H-5-one, as claimed in claim 1.

8. 1(3),4 - dihydro-2-(4'-pyridyl)-7-nitro-1,3,4 - benzotriazepin-5H-5-one, as claimed in claim 1.

9. 1(3),4 - dihydro-2-propyl-1,3,4-benzotriazepin-5H-5-one, as claimed in claim 1.

10. 7-chloro-1(3),4-dihydro-2-propyl - 1,3,4 - benzotriazepin-5H-5-one, as claimed in claim 1.

11. 1(3),4-dihydro-7-nitro-2-propyl-1,3,4 - benzotriazepin-5H-5-one, as claimed in claim 1.

12. 1(3),4 - dihydro-2-nonyl-1,3,4 - benzotriazepin-5H-5-one, as claimed in claim 1.

13. 1(3),4 - dihydro-2-methyl-1,3,4-benzotriazepin-5H-5-one, as claimed in claim 1.

14. 2-biphenyl-1(3),4-dihydro-1,3,4-benzotriazepin-5H-5-one, as claimed in claim 1.

15. 2-benzyl-1,4-dihydro-1-methyl-1,3,4-benzotriazepin-5H-5-one, as claimed in claim 1.

16. 1,4-dihydro-1,2-dimethyl-1,3,4-benzotriazepin-5H-5-one, as claimed in claim 1.

References Cited
UNITED STATES PATENTS 3,400,119   9/1968   Wenner et al. _____ 260—239.3

HENRY R. JILES, Primary Examiner

R. T. BOND, Assistant Examiner

U.S. Cl. X.R.

424—244, 263